(12) United States Patent
Wu

(10) Patent No.: US 10,757,730 B2
(45) Date of Patent: Aug. 25, 2020

(54) DEVICE OF HANDLING CLEAR CHANNEL ASSESSMENT AND TRANSMISSION IN UNLICENSED BAND

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/920,868

(22) Filed: Oct. 22, 2015

(65) Prior Publication Data

US 2016/0119949 A1    Apr. 28, 2016

Related U.S. Application Data

(60) Provisional application No. 62/067,446, filed on Oct. 23, 2014.

(51) Int. Cl.
*H04W 74/00* (2009.01)
*H04L 5/00* (2006.01)
*H04L 27/00* (2006.01)
*H04L 27/26* (2006.01)

(52) U.S. Cl.
CPC ........... *H04W 74/002* (2013.01); *H04L 5/001* (2013.01); *H04L 5/0048* (2013.01); *H04L 27/0006* (2013.01); *H04L 27/2601* (2013.01)

(58) Field of Classification Search
None
See application file for complete search history.

(56) References Cited

U.S. PATENT DOCUMENTS

| | | | |
|---|---|---|---|
| 8,666,319 B2 | 3/2014 | Kloper | |
| 2014/0038625 A1 | 2/2014 | Palanivelu | |
| 2014/0362780 A1* | 12/2014 | Malladi | H04W 16/14 370/329 |
| 2014/0378157 A1* | 12/2014 | Wei | H04W 16/14 455/454 |
| 2015/0110066 A1* | 4/2015 | Gaal | H04W 72/0453 370/330 |
| 2015/0148053 A1* | 5/2015 | Patel | H04W 72/0426 455/452.1 |
| 2015/0289208 A1* | 10/2015 | Liu | H04L 1/1887 370/252 |

(Continued)

FOREIGN PATENT DOCUMENTS

CN   103339979 A   10/2013
CN   103843443 A   6/2014

(Continued)

OTHER PUBLICATIONS

Search Report dated Jun. 15, 2016 for EP application No. 15191175.7, pp. 1-7.

(Continued)

*Primary Examiner* — Charles C Jiang
*Assistant Examiner* — Saad Khawar
(74) *Attorney, Agent, or Firm* — Winston Hsu

(57) ABSTRACT

A network comprises instructions of suspending transmitting at least one first orthogonal frequency division multiplexing (OFDM) symbol in a subframe on a component carrier; and performing a clear channel assessment (CCA) operation within duration of the at least one first OFDM symbol in the subframe on the component carrier.

5 Claims, 5 Drawing Sheets

(56) References Cited

U.S. PATENT DOCUMENTS

| | | | |
|---|---|---|---|
| 2016/0057664 A1* | 2/2016 | Ahn | H04J 11/0069 370/331 |
| 2016/0309464 A1* | 10/2016 | Mukherjee | H04W 28/06 |
| 2017/0150367 A1* | 5/2017 | Han | H04L 5/001 |

FOREIGN PATENT DOCUMENTS

| | | |
|---|---|---|
| GB | 2497780 A | 6/2013 |
| WO | 2012/040520 A1 | 3/2012 |

OTHER PUBLICATIONS

InterDigital Communications, "On design targets and supported functionality for LTE LAA", 3GPP TSG-RAN WG1#78bis, R1-144219, Oct. 6-10, 2014, Ljubljana, Slovenia, XP050875491, pp. 1-6.

LG Electronics, Candidate solutions for LAA operation, 3GPP TSG RAN WG1 Meeting #78bis, R1-144042, Oct. 6-10, 2014, pp. 1-6, Ljubljana, Slovenia.

Office Action dated Oct. 25, 2016 for the Japanese Application No. 2015-208996, filing date Oct. 23, 2015, pp. 1-5.

3GPP TS 36.300 V12.3.0, Sep. 2014.

3GPP TS 36.331 V12.3.0, Sep. 2014.

Draft ETSI EN 301 893 V1.7.2, Jul. 2014.

European Search report dated Feb. 23, 2016 for EP application No. 15191175.7.

Search Report dated Mar. 28, 2017 for EP application No. 17151229.6, pp. 1-4.

Ericsson, "Initial discussion on solutions for identified LAA functionalities", 3GPP TSG-RAN WG1 Meeting #78bis, R1-144267, Oct. 6-10, 2014, Ljubljana, Slovenia, XP050869892, pp. 1-3.

Qualcomm Technologies, Inc., "Qualcomm Research LTE in Unlicensed Spectrum: Harmonious Coexistence with Wi-Fi", Jun. 2014, XP055183824, pp. 1-19.

Office action dated Apr. 27, 2018 for the China application No. 201510698764.7, filing date Oct. 23, 2015, pp. 1-6.

NTT Docomo, Inter-operator and Inter-RAT co-existence techniques for LAA using LTE, 3GPP TSG RAN WG1 Meeting #78bis, R1-144339, Oct. 6-10, 2014, pp. 1-6, Ljubljana, Slovenia.

Huawei, HiSilicon, Potential solutions for LAA-TE design, 3GPP TSG RAN WG1 Meeting #78bis, R1-143726, Oct. 6-10, 2014, pp. 1-5, Ljubljana, Slovenia.

Office Action dated Feb. 13, 2018 for the Japanese Application No. 2017-009205, filing date Jan. 23, 2017, pp. 1-3.

* cited by examiner

… (1/2)

DEVICE OF HANDLING CLEAR CHANNEL ASSESSMENT AND TRANSMISSION IN UNLICENSED BAND

CROSS REFERENCE TO RELATED APPLICATIONS

This application claims the benefit of U.S. Provisional Application No. 62/067,446, filed on Oct. 23, 2014, which is incorporated herein by reference.

BACKGROUND OF THE INVENTION

1. Field of the Invention

The present invention is related a communication device used in a wireless communication system, and more particularly, to a communication device of handling a clear channel assessment and a signal transmission in an unlicensed band in a wireless communication system.

2. Description of the Prior Art

A long-term evolution (LTE) system developed by the 3rd Generation Partnership Project (3GPP) is a successor of the universal mobile telecommunication system (UMTS) for further enhancing performance of the UMTS to satisfy increasing needs of data transmission. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

Network operators propose to offload network traffic of the LTE/LTE-A system to an unlicensed band, to ease load of the network traffic.

For transmission in the unlicensed band, listen before talk (LBT) may be needed. To meet the LBT requirement, a clear channel assessment (CCA) operation (e.g., CCA check) may be performed within a designated time period before a transmission is performed. In detail, the eNB may suspend a transmission on a downlink (DL) carrier in an unlicensed band for a first period to perform a first CCA operation on the DL carrier in the unlicensed band. In addition, the eNB may suspend another transmission for a second period and perform a second CCA operation for the second period, when the result of the first CCA operation indicates the DL carrier is busy. In this situation, the UE receives no data during the first period and the second period. Thus, throughput of the UE is decreased due to the suspensions of the transmissions related to the CCA operation. In addition, the suspension of the transmission during the first period and the second period may result in incorrect measurement results. Hence, how to handle a CCA and the transmissions on the carrier (i.e., unlicensed carrier) in the unlicensed band is an important topic to be discussed.

SUMMARY OF THE INVENTION

The present invention therefore provides a communication device for handling a clear channel assessment and a signal transmission in an unlicensed band to solve the abovementioned problem.

A network for handling a clear channel assessment (CCA) in an unlicensed band comprises a storage unit for storing instructions and a processing means coupled to the storage unit. The processing means is configured to execute the instructions stored in the storage unit. The instructions comprise suspending transmitting at least one first orthogonal frequency division multiplexing (OFDM) symbol in a subframe on a component carrier; and performing a CCA operation within duration of the at least one first OFDM symbol in the subframe on the component carrier.

A network for handling a clear channel assessment (CCA) in an unlicensed band comprises a storage unit for storing instructions and a processing means coupled to the storage unit. The processing means is configured to execute the instructions stored in the storage unit. The instructions comprise determining whether to suspend data transmission in a subframe on a first component carrier; transmitting a first message for indicating a suspension of the data transmission to at least one communication device on a second component carrier according to the determination; and suspending the data transmission on the first component carrier for a time period.

A network for handling a transmission in an unlicensed band comprises a storage unit for storing instructions and a processing means coupled to the storage unit. The processing means is configured to execute the instructions stored in the storage unit. The instructions comprise determining to apply a subframe format to a subframe on a first component carrier, wherein a transmission of at least one orthogonal frequency division multiplexing (OFDM) symbol is off in the subframe format; transmitting a message for indicating that the subframe format is applied to the subframe on the first component carrier to at least one communication device on a second component carrier according to the determination; applying the subframe format to the subframe on the first component carrier; and suspending the transmission of the at least one OFDM symbol in the subframe on the first component carrier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
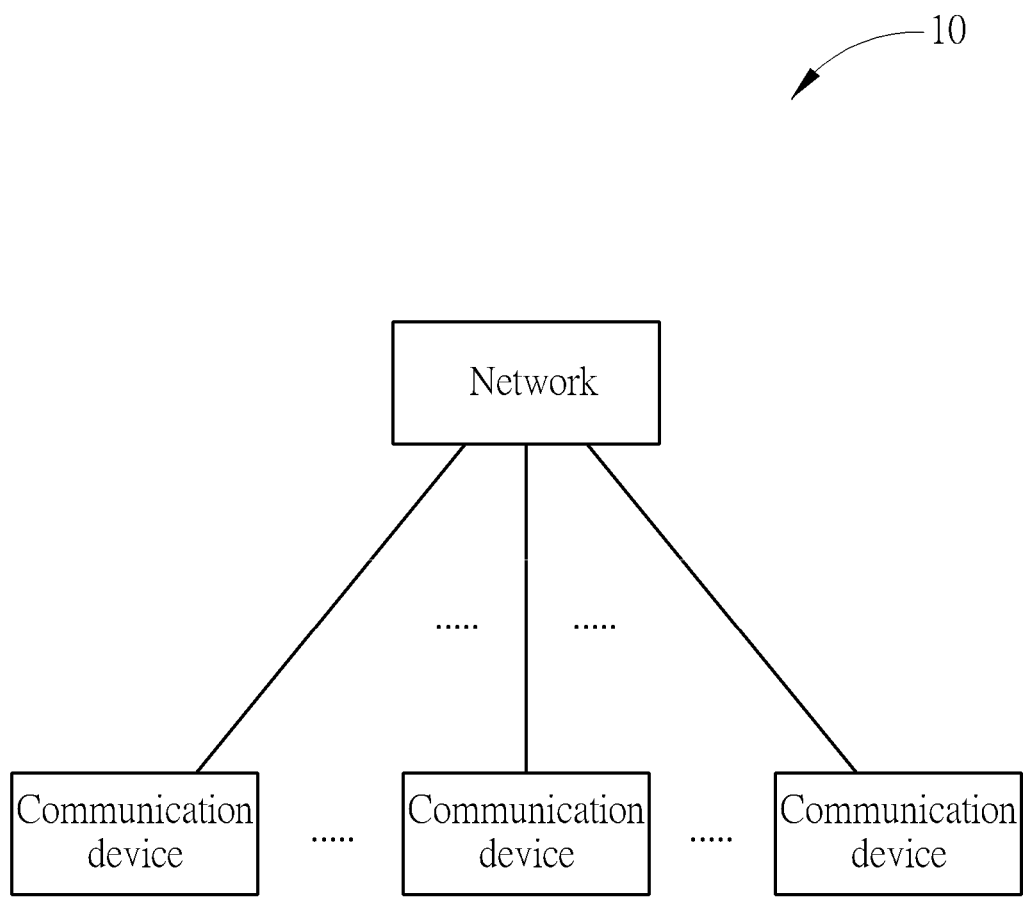
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. The network and a communication device may communicate with each other via one or more licensed carrier(s) and/or unlicensed carrier (s). Practically, the network can be an evolved UTRAN (E-UTRAN) comprising at least one evolved NB (eNB) and/or at least one relay in a long term evolution (LTE) system, a LTE-Advanced (LTE-A) system or an evolution of the LTE-A system.

A communication device can be a user equipment (UE), a low cost device (e.g., machine type communication (MTC) device), a device-to-device (D2D) device, a mobile phone, a laptop, a tablet computer, an electronic book, a portable computer system, a vehicle or an airplane. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
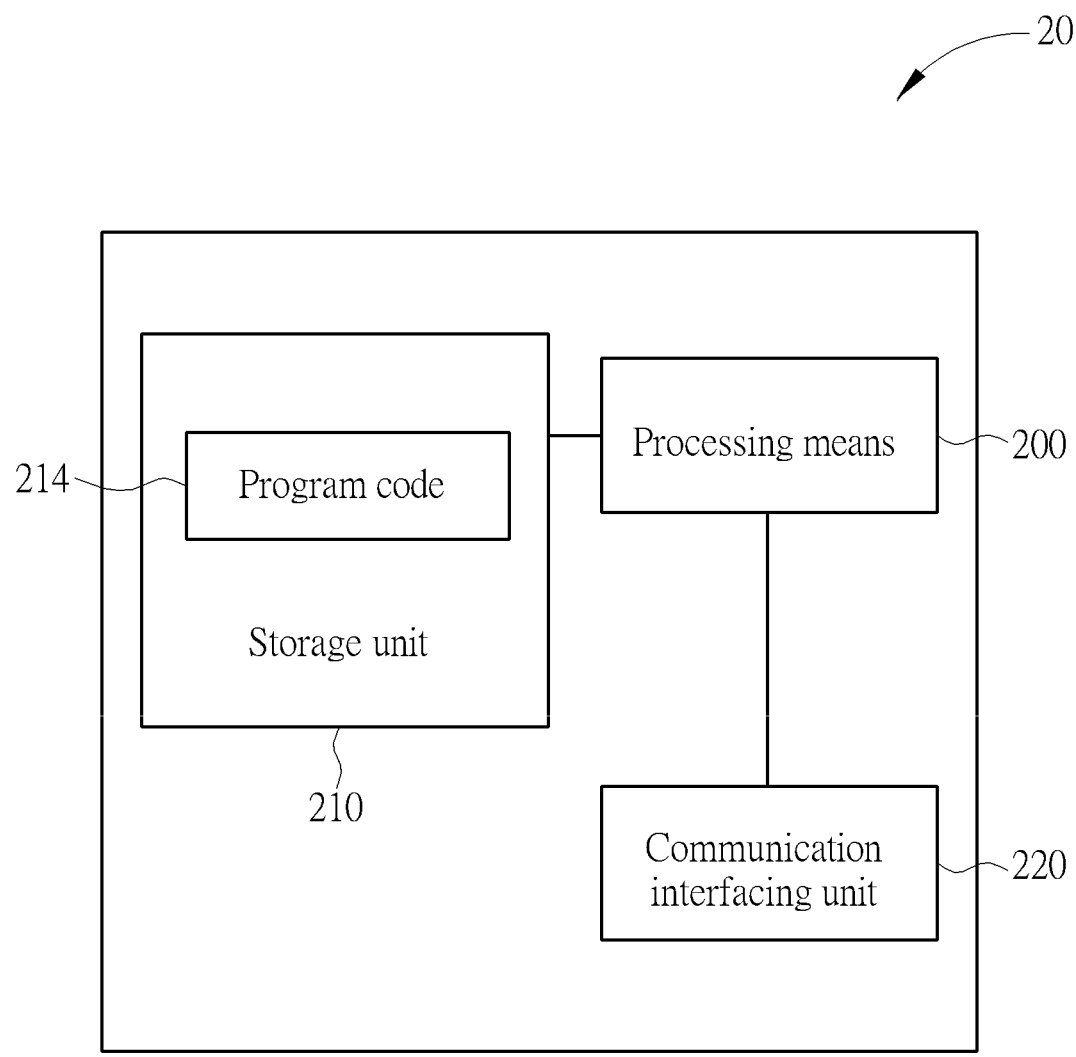
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
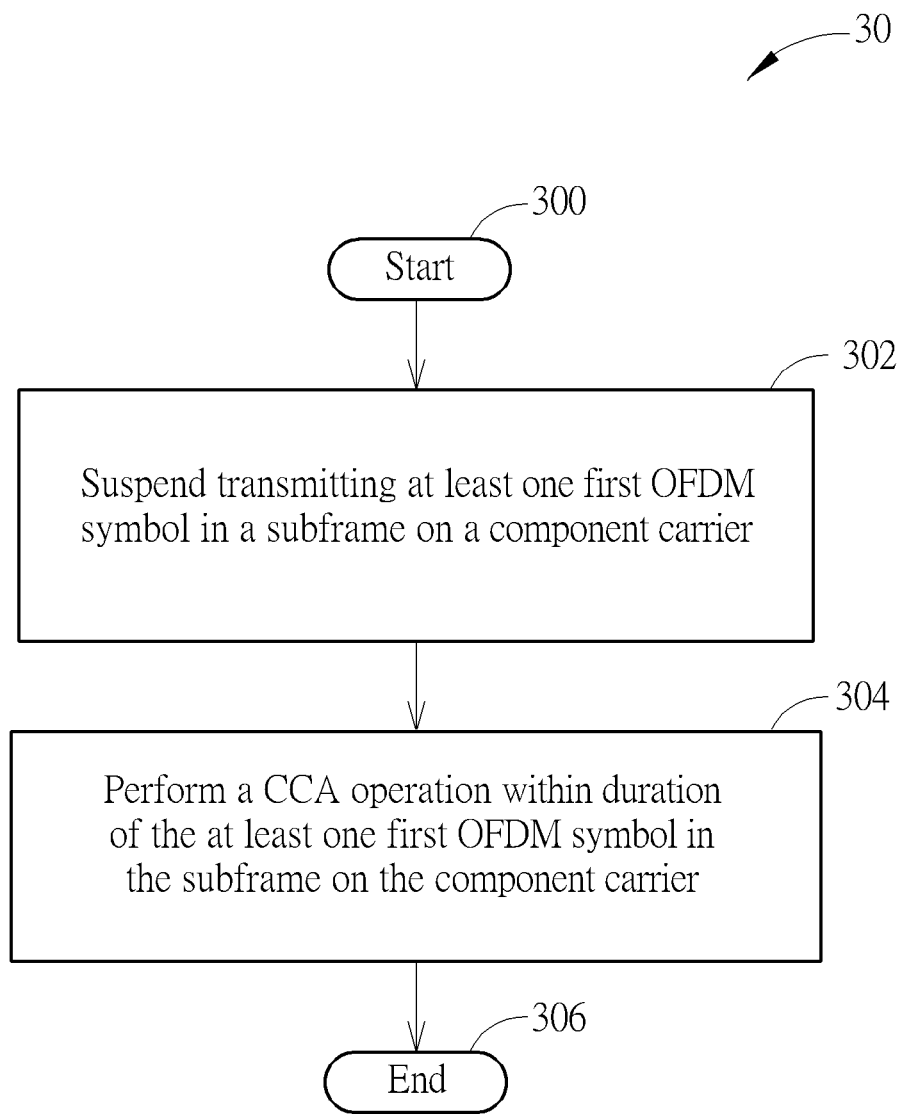
FIG. 3 is a flowchart of a process according to an example of the present invention.

FIG. 3 is a flowchart of process 30 according to an example of the present invention. The process 30 may be utilized in a network (e.g., eNB) in FIG. 1, to handle a clear channel assessment (CCA) in an unlicensed band. The process 30 may be compiled into the program code 214 and includes the following steps:

Step 300: Start.

Step 302: Suspend transmitting at least one first orthogonal frequency division multiplexing (OFDM) symbol in a subframe on a component carrier.

Step 304: Perform a CCA operation within duration of the at least one first OFDM symbol in the subframe on the component carrier.

Step 306: End.

According to the process 30, the network may suspend transmitting at least one first OFDM symbol in a subframe on a component carrier. Then, the network may perform a CCA operation within duration of the at least one first OFDM symbol in the subframe on the component carrier. That is, the network may need to suspend transmitting one or more OFDM symbols. The CCA operation may or may not last for the whole duration of the at least one first OFDM symbol.

Realization of the present invention is not limited to the above description. The following example may be applied to the process 30.

In one example, the network may determine to suspend transmitting the at least one first OFDM symbol in the subframe on the component carrier, when the at least one first OFDM symbol does not include at least one reference signal (RS). In one example, the at least one RS may include a primary synchronization signal (PSS), a secondary synchronization signal (SSS), a cell-specific RS (CRS), a channel state information (CSI) RS (CSI-RS), and/or a demodulation RS (DM-RS), but is not limited herein. Thus, a communication device (e.g., UE) can perform measurements by using the RS(s), and correct measurement results (e.g., channel quality indicator (CQI) value, reference signal received power (RSRP), or reference signal received quality (RSRQ)) can be reported to the network. As a result, the network does not receive incorrect measurement results by suspending transmitting the at least one OFDM symbol which does not include the RS(s).

In another example, the network in the process 30 may transmit the at least one RS within duration of at least one second OFDM symbol, if the duration of the at least one first OFDM symbol is used for performing the CCA operation. Thus, the communication device can measure the at least one RS contained in the at least one second OFDM symbol no matter the at least one first OFDM symbol contains the at least one RS or not. Furthermore, in one example, the CCA operation may include at least one of energy detection, a WiFi carrier sensing and a LTE carrier sensing, but is not limited herein.

For example, the network may perform the CCA operation by using the energy detection, before starting data transmission on a component carrier in the unlicensed band. The status of the component carrier may be determined according to the result of the energy detection. That is, the component carrier may be determined busy, when the result of the energy detection is greater than a threshold. In one example, the network may suspend the data transmission for a first time period, when the component carrier is determined busy (e.g., occupied) according to the CCA operation. During the first time period, the network may perform another CCA operation. In one example, the network may perform data transmission for a second time period, when the component carrier is determined not busy according to the CCA operation. That is, the component carrier can be used for the time period, when the result of the energy detection is less than the threshold. It is noted that the network is not allowed to transmit an incomplete OFDM symbol in a subframe. In other words, the network should not transmit the incomplete OFDM symbol if the network determines to perform the data transmission, when the first or the second time period ends within an OFDM symbol, i.e. not ends at boundary of the OFDM symbol. Thus the communication device may receive and demodulate a complete OFDM symbol in a subframe.

As a result, according to the above description, the network does not receive incorrect measurement results by suspending transmitting OFDM symbol(s) which does not include RS(s).

Figure 4:
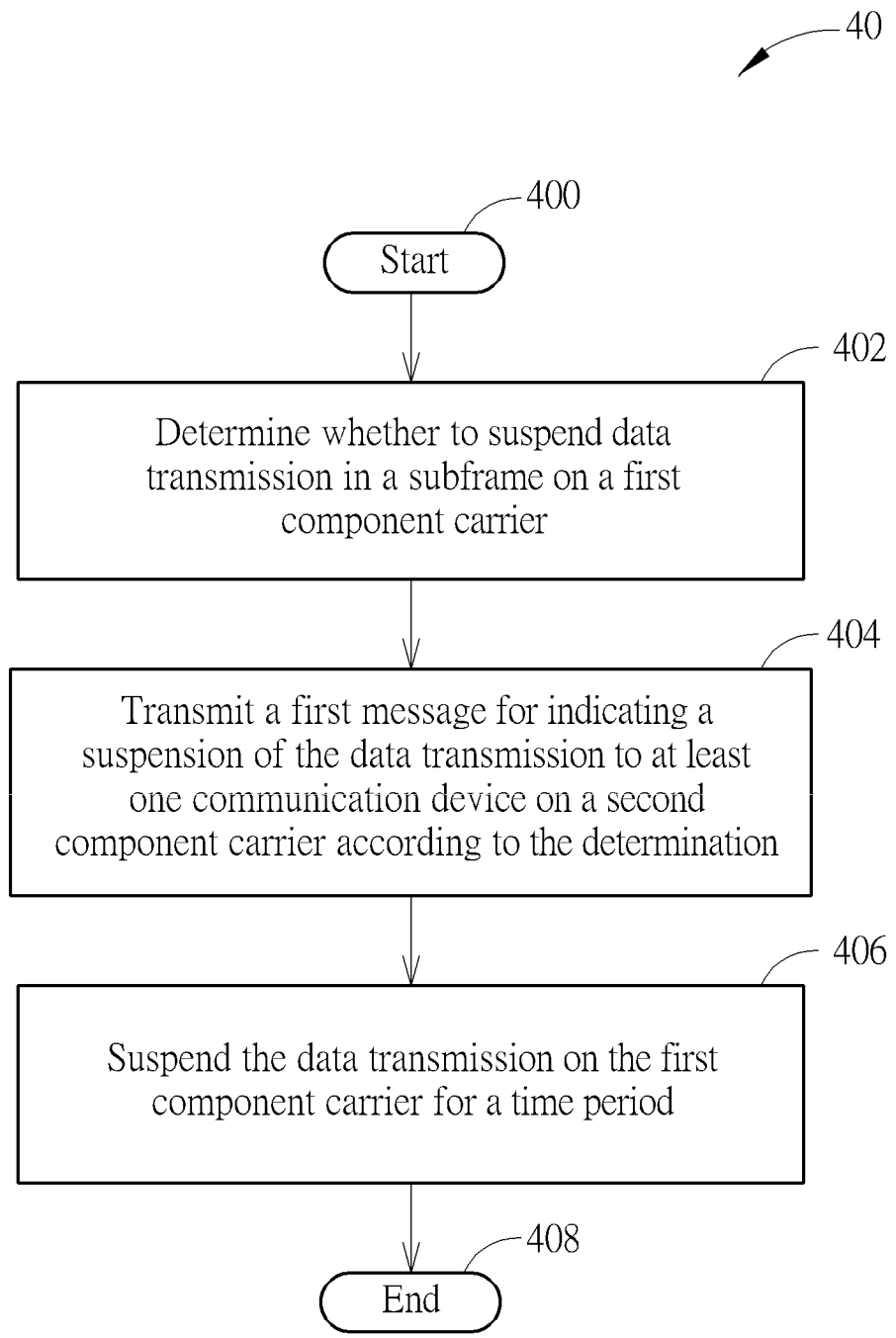
FIG. 4 is a flowchart of a process according to an example of the present invention.

FIG. 4 is a flowchart of process 40 according to an example of the present invention. The process 40 may be utilized in a network (e.g., eNB) in FIG. 1, to handle a CCA in an unlicensed band. The process 40 may be compiled into the program code 214 and includes the following steps:

Step 400: Start.

Step 402: Determine whether to suspend data transmission in a subframe on a first component carrier.

Step 404: Transmit a first message for indicating a suspension of the data transmission to at least one communication device on a second component carrier according to the determination.

Step 406: Suspend the data transmission on the first component carrier for a time period.

Step 408: End.

According to the process 40, the network may determine whether to suspend data transmission in a subframe on a first component carrier. The network may transmit a first message for indicating a suspension of the data transmission to at least one communication device (e.g., UE(s)) on a second component carrier according to the determination. Then, the network may suspend the data transmission on the first component carrier for a time period. That is, the network may notify the at least one communication device that the data transmission is suspended. Thus, the at least one communication device may suspend receiving the data transmission in the subframe on the first component carrier, e.g., by turning off the receiver or making the receiver in a low power consumption state, after receiving the first message. As a result, power consumption of the at least one communication device can be reduced.

Realization of the present invention is not limited to the above description. The following example may be applied to the process 40.

In one example, the data transmission may be suspended for performing a CCA operation in the subframe on the first component carrier. In one example, the data transmission may be suspended, after the network performs a CCA operation in the subframe on the first component carrier and the first component carrier is determined busy according to the CCA operation. That is, the network may suspend the data transmission before and/or after performing the CCA operation.

In one example, the data transmission may be performed on at least one OFDM symbol of the subframe on the first component carrier. Further, the time period may include duration of the at least one OFDM symbol. In one example, the time period may further include a transmission of at least one first cyclic prefix (CP) for the at least one OFDM symbol. In one example, the at least one OFDM symbol may not contain one or more specific signals which include at least one of a PSS, a SSS, a CRS, a CSI-RS, a physical DL control channel (PDCCH), and a physical broadcast channel (PBCH).

In order not to report an incorrect measurement result to the network, the at least one communication device may not measure the one or more specific signals, if the at least one OFDM symbol which contains the one or more specific signals is not transmitted. In one example, the at least one communication device may not measure a CRS or a CSI-RS in the at least one OFDM symbol, since the at least one communication device knows that the at least one OFDM symbol which contains the CRS and/or the CSI-RS is not transmitted. Alternatively, the at least one communication device may measure the one or more specific signals, but not report one or more measurement results which are measured in the at least one OFDM symbol, if the at least one OFDM symbol which contains the one or more specific signals is not transmitted. In one example, the at least one communication device may not report corresponding CRS and/or CSI-RS measurement results to the network, under a condition that the at least one OFDM symbol contains one or more the CRS and/or the CSI-RS. Thus, the at least one communication device may not report the incorrect measurement results to the network. In one example, the first component carrier may be in an unlicensed band, and the second component carrier may be in a licensed band.

In one example, the network may transmit a second message for indicating a resumption of the data transmission to the at least one communication device on the second component carrier after the time period, after transmitting the first message for indicating the suspension of the data transmission. In one example, the first message may be transmitted via a PDCCH, an enhanced PDCCH (ePDCCH) or a physical DL shared channel (PDSCH). Similarly, the second message may be transmitted via a PDCCH, an ePDCCH or a PDSCH. In one example, the first message may be transmitted via the PDCCH or the ePDCCH with a Cyclic Redundancy Checks (CRC) scrambled with a radio network temporary identifier (RNTI). Similarly, the second message may be transmitted via the PDCCH or the ePDCCH with a CRC scrambled with a RNTI. The communication device may decode the PDCCH or the ePDCCH with the CRC using the RNTI to obtain the first and/or the second messages. In one example, the first message may be transmitted via the PDSCH, and the first message may be included in a medium access control (MAC) protocol data unit (PDU) or in a MAC control element. Similarly, the second message may be transmitted via the PDSCH, and the second message may be included in a MAC PDU or in a MAC control element.

In one example, the data transmission may include a transmission of a LTE signal except at least one of a PSS, a SSS, a CRS, a CSI-RS, a PDCCH, and a PBCH. In one example, the first message may include time information for indicating when to resume the data transmission or when the suspension of the data transmission ends. That is, the network may not need to transmit another message (e.g., second message) for indicating the time information on the second component carrier. In addition, the first message may be a broadcast message transmitted by the network to the at least one communication device.

Figure 5:
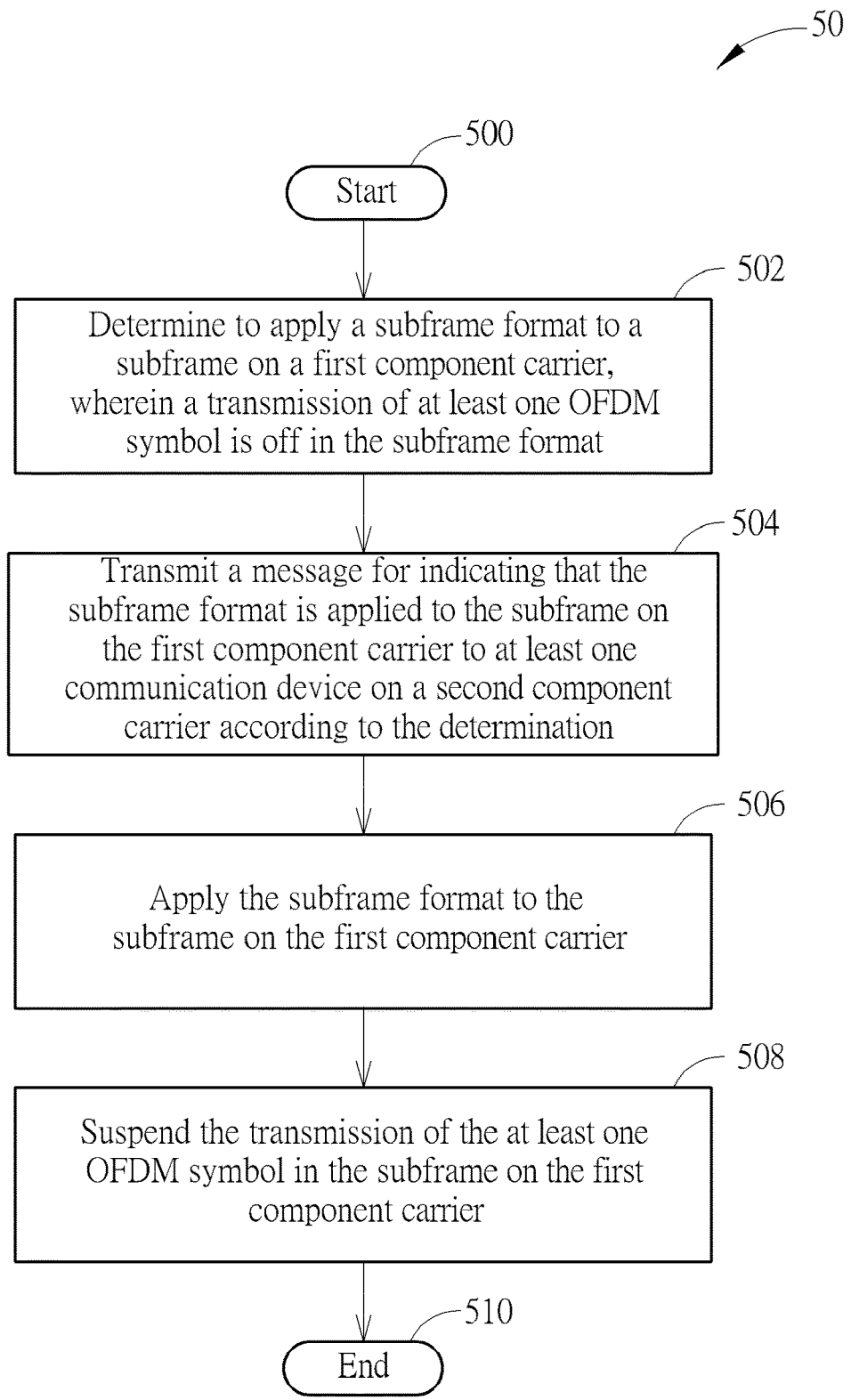
FIG. 5 is a flowchart of a process according to an example of the present invention.

FIG. 5 is a flowchart of process 50 according to an example of the present invention. The process 50 may be utilized in a network (e.g., eNB) in FIG. 1, to handle a transmission in an unlicensed band. The process 50 may be compiled into the program code 214 and includes the following steps:

Step 500: Start.

Step 502: Determine to apply a subframe format to a subframe on a first component carrier, wherein a transmission of at least one OFDM symbol is off in the subframe format.

Step 504: Transmit a message for indicating that the subframe format is applied to the subframe on the first component carrier to at least one communication device on a second component carrier according to the determination.

Step 506: Apply the subframe format to the subframe on the first component carrier.

Step 508: Suspend the transmission of the at least one OFDM symbol in the subframe on the first component carrier.

Step 510: End.

According to the process 50, the network may determine to apply a subframe format to a subframe on a first component carrier, wherein a transmission of at least one OFDM symbol is off in the subframe format. Then, the network may transmit a message for indicating that the subframe format is applied to the subframe on the first component carrier to at least one communication device (e.g., UE(s)) on a second component carrier according to the determination. The network may apply the subframe format to the subframe on the first component carrier. The network may suspend the transmission of the at least one OFDM symbol in the subframe on the first component carrier. That is, the network may indicate that the transmission of the at least one OFDM symbol is off (suspended) by using the subframe format. Thus, the at least one communication device would know how to decode the transmission in the subframe on the first component carrier after receiving the message.

Realization of the present invention is not limited to the above description. The following example may be applied to the process 50.

In one example, when a communication device receives the message in a first subframe, the communication device applies the subframe format to a second subframe. The second subframe may be the first subframe, or may be a subframe that is before the first subframe or m subframe(s) (m>0) after the first subframe. For example, when the communication device receives the message in the subframe n (e.g., first subframe), the communication device applies the subframe format to subframes (n+1), (n+2), ..., (n+m) (e.g., m subframes).

In one example, a transmission of at least one CP of the at least one OFDM symbol may be off in the subframe format, when the transmission of the at least one OFDM symbol is off in the subframe format. That is, the network may not transmit the at least one CP and the at least one OFDM symbol in the subframe format. In one example, the message may be transmitted via a PDCCH, an ePDCCH or a PDSCH. In one example, the message may be transmitted via the PDCCH or the ePDCCH with a CRC scrambled with a RNTI. The communication device may decode the PDCCH or the ePDCCH with the CRC using the RNTI to obtain the message. Further, the message may be transmitted via the PDSCH, and the message may be included in a MAC PDU or in a MAC control element. That is, the message may be processed (e.g., included or scrambled) in different ways, when the message is transmitted to the at least one communication device via different physical channels (e.g., PDCCH, ePDCCH, PDSCH).

In one example, the at least one OFDM symbol may not contain at least one of a PSS, a SSS, a CRS, a CSI-RS, a DM-RS, a PDCCH, and a PBCH. That is, the at least one OFDM symbol (or the at least one CP) is not used for transmitting any of the above signals according to the subframe format. The at least one communication device may not report the incorrect measurement results to the network as described in exemplary description for process 40.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a method for handling a clear channel check and a transmission in an unlicensed band. Suspending of transmission of OFDM symbol(s) is notified to communication device(s) to avoid incorrect measurement results. In addition, power consumption of the communication device(s) can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network for handling data transmission, comprising:
a storage device for storing instructions of:
transmitting a physical downlink control channel (PDCCH) carrying an uplink grant;
determining whether to suspend data transmission from the UL grant in a subframe on a first component carrier;
transmitting a first message for indicating a suspension of data transmission to at least one communication device on a second component carrier according to the determination;
suspending the data transmission from the UL grant on the first component carrier for a time period; and
transmitting a second message for indicating a resumption of the data transmission to the at least one communication device on the second component carrier after the time period; and
a processing circuit, coupled to the storage device, configured to execute the instructions stored in the storage device.

2. The network of claim 1, wherein the data transmission is suspended for performing a CCA operation in the subframe on the first component carrier or the data transmission is suspended, after the network performs a CCA operation in the subframe on the first component carrier and the first component carrier is determined busy according to the CCA operation.

3. The network of claim 1, wherein the time period comprises duration of at least one orthogonal frequency division multiplexing (OFDM) symbol.

4. The network of claim 3, wherein under a condition that the at least one OFDM symbol contains one or more CRS and/or CSI-RS, the at least one communication device does not report corresponding CRS and/or CSI-RS measurement results to the network.

5. The network of claim 1, wherein the data transmission comprises a transmission of a long-term evolution (LTE) signal except at least one of a PSS, a SSS, a CRS, a CSI-RS, a PDCCH, and a PBCH.

* * * * *